US012640625B2

(12) United States Patent
Easterbrook et al.

(10) Patent No.: US 12,640,625 B2
(45) Date of Patent: May 26, 2026

(54) MOTOR ASSEMBLY AND HEAT EXCHANGER APPARATUS

(71) Applicant: Toshiba International Corporation, Houston, TX (US)

(72) Inventors: Matthew Easterbrook, Houston, TX (US); Junemo Son, Cypress, TX (US)

(73) Assignee: Toshiba International Corporation, Houston, TX (US)

( * ) Notice: Subject to any disclaimer, the term of this patent is extended or adjusted under 35 U.S.C. 154(b) by 215 days.

(21) Appl. No.: 18/608,024

(22) Filed: Mar. 18, 2024

(65) Prior Publication Data

US 2025/0293571 A1    Sep. 18, 2025

(51) Int. Cl.
| | |
|---|---|
| *H02K 9/18* | (2006.01) |
| *H02K 9/10* | (2006.01) |
| *H02K 9/12* | (2006.01) |
| *F28D 1/02* | (2006.01) |
| *F28D 1/053* | (2006.01) |
| *F28D 21/00* | (2006.01) |
| *H02K 9/22* | (2006.01) |

(52) U.S. Cl.
CPC ................. *H02K 9/18* (2013.01); *H02K 9/10* (2013.01); *H02K 9/12* (2013.01); *F28D 1/0233* (2013.01); *F28D 1/05341* (2013.01); *F28D 2021/0029* (2013.01); *H02K 9/227* (2021.01)

(58) Field of Classification Search
CPC ............ H02K 9/227; H02K 9/18; H02K 9/00; H02K 9/02; H02K 9/04; H02K 9/06; H02K 9/08; H02K 9/10; H02K 9/12; H02K 9/14; H02K 9/16; F28D 1/0233; F28D 1/05341; F28D 2021/0029
USPC ...................... 310/52, 58, 59, 60 A, 60 R, 64
See application file for complete search history.

(56) References Cited

U.S. PATENT DOCUMENTS

| | | | | |
|---|---|---|---|---|
| 4,348,604 A | * | 9/1982 | Thode ...................... | H02K 9/18 |
| | | | | 310/59 |
| 4,845,394 A | * | 7/1989 | Kleinhans ................ | H02K 9/18 |
| | | | | 310/59 |
| 2008/0238224 A1 | * | 10/2008 | Ressel ...................... | H02K 9/18 |
| | | | | 310/64 |
| 2014/0028124 A1 | * | 1/2014 | Noack ...................... | H02K 9/10 |
| | | | | 310/59 |

* cited by examiner

*Primary Examiner* — Alexander A Singh
(74) *Attorney, Agent, or Firm* — Baker Botts L.L.P.

(57) ABSTRACT

The present disclosure provides a motor assembly. The motor assembly includes a motor including a housing, and a heat exchanging apparatus configured on the motor and fluidically coupled to the housing. The heat exchanging apparatus includes a primary compartment adapted to receive a working fluid from the housing, a first compartment adapted to receive a first portion of the working fluid from the primary compartment and transfer the first portion to the housing, and a second compartment adapted to receive a second portion of the working fluid from the primary compartment and transfer the second portion to the housing. The heat exchanging apparatus facilitates exchange of heat between the working fluid and a cooling fluid, such that the first and second portions of the working fluid being transferred to the housing is cooler that the working fluid received by the primary compartment of the heat exchanging apparatus.

20 Claims, 9 Drawing Sheets

MOTOR ASSEMBLY AND HEAT EXCHANGER APPARATUS

TECHNICAL FIELD

Embodiments of the present disclosure relate to a motor assembly, and more particularly, to a heat exchanging apparatus for cooling a motor of the motor assembly.

BACKGROUND

Motor operation generates enormous heat inside a housing of the motor. The housing may include a stator and a rotor rotatably configured with the stator. If the heat generated during operation of the motor is not controlled, or regulated, it may result in lasting damage to components of the motor, thereby impacting the operating lifespan of the motor and increasing expenses related to maintenance of the motor. Further, increased temperature in the housing of the motor may decrease an operating efficiency of the motor. Generally, a heat exchanging apparatus is configured with the motor to circulate a working fluid from within the housing of the motor to the heat exchanger, sometimes back to the housing. The heat exchanger is adapted to cool the working fluid, and when the cooled working fluid is recirculated to the housing, the temperature of the housing and the components present in the housing are also regulated.

SUMMARY

Embodiments of the present disclosure relate to a motor assembly, and more particularly, to a heat exchanging apparatus for cooling a motor of the motor assembly.

In a first aspect, the present disclosure provides a motor assembly including a motor including a first end and a second end along a longitudinal axis of the motor. The motor further includes a stator and a rotor rotatably configured in the stator. The stator and rotor are provided in a housing of the motor. The motor assembly further includes a heat exchanging apparatus adapted to be configured on an external side of the motor, along the longitudinal axis of the motor between the first end and the second end of the motor. The heat exchanging apparatus is adapted to be fluidically coupled to the housing of the motor. The heat exchanging apparatus includes a primary compartment arranged along the longitudinal axis of the heat exchanging apparatus. The primary compartment is adapted to receive a working fluid from the housing of the motor. The heat exchanging apparatus further includes a first compartment arranged along the longitudinal axis of the heat exchanging apparatus and disposed adjacent to the primary compartment. The first compartment is adapted to receive a first portion of the working fluid from the primary compartment and transfer the first portion of the working fluid to the housing of the motor. The heat exchanging apparatus further includes a second compartment arranged along the longitudinal axis of the heat exchanging apparatus and disposed adjacent to the primary compartment and opposite to the first compartment. The second compartment is adapted to receive a second portion of the working fluid from the primary compartment and transfer the second portion of the working fluid to the housing of the motor. The heat exchanging apparatus is adapted to facilitate exchange of heat between the working fluid and a cooling fluid, such that the first and second portions of the working fluid being transferred to the housing of the motor is cooler that the working fluid received by the primary compartment of the heat exchanging apparatus.

In some embodiments, the heat exchanging apparatus is made of a first material including aluminum (Al).

In some embodiments, the primary compartment is partially fluidically separated from the first and second compartments by first and second walls, respectively. The first and second walls are further adapted to at least partially thermally isolate the primary compartment from the first and second compartments, respectively.

In some embodiments, the primary compartment of the heat exchanging apparatus includes a plurality of primary tubes extending along the longitudinal axis. The primary tubes are adapted for flow of the cooling fluid therethrough. The cooling fluid is adapted to exchange heat with the working fluid.

In some embodiments, the first compartment of the heat exchanging apparatus includes a plurality of first tubes extending along the longitudinal axis. The first tubes are adapted for flow of the cooling fluid therethrough. The cooling fluid is adapted to exchange heat with the first portion of the working fluid.

In some embodiments, the second compartment of the heat exchanging apparatus includes a plurality of second tubes extending along the longitudinal axis. The second tubes are adapted for flow of the cooling fluid therethrough. The cooling fluid is adapted to exchange heat with the second portion of the working fluid.

In some embodiments, the cooling fluid is adapted to flow along the longitudinal axis of the heat exchanging apparatus.

In some embodiments, the first portion of the working fluid towards the first end of the motor is cooler than the first portion of the working fluid towards the second end of the motor.

In some embodiments, the second portion of the working fluid towards the first end of the motor is cooler than the second portion of the working fluid towards the second end of the motor.

In some embodiments, the cooling fluid exiting the heat exchanging apparatus is adapted to flow along the housing of the motor, at the second end of the motor to facilitate cooling of the second end of the motor.

In a second aspect, the present disclosure provides a heat exchanging apparatus adapted for use with a motor. The motor includes a first end and a second end along a longitudinal axis of the motor. The motor further includes a stator and a rotor rotatably configured in the stator. The stator and rotor are provided in a housing of the motor. The heat exchanging apparatus is adapted to be configured on an external side of the motor, along the longitudinal axis of the motor between the first end and the second end of the motor. The heat exchanging apparatus is adapted to be fluidically coupled to the housing of the motor. The heat exchanging apparatus includes a primary compartment arranged along the longitudinal axis of the heat exchanging apparatus. The primary compartment is adapted to receive a working fluid from the housing of the motor. The heat exchanging apparatus further includes a first compartment arranged along the longitudinal axis of the heat exchanging apparatus and disposed adjacent to the primary compartment. The first compartment is adapted to receive a first portion of the working fluid from the primary compartment and transfer the first portion of the working fluid to the housing of the motor. The heat exchanging apparatus further includes a second compartment arranged along the longitudinal axis of the heat exchanging apparatus and disposed adjacent to the primary compartment and opposite to the first compartment. The second compartment is adapted to receive a second portion of the working fluid from the primary compartment and transfer the second portion of the working fluid to the housing of the motor. The heat exchanging apparatus is adapted to facilitate exchange of heat between the working fluid and a cooling fluid, such that the first and second portions of the working fluid being transferred to the housing of the motor is cooler that the working fluid received by the primary compartment of the heat exchanging apparatus.

In some embodiments, the heat exchanging apparatus is made of a first material including aluminum (Al).

In some embodiments, the primary compartment is partially fluidically separated from the first and second compartments by first and second walls, respectively. The first and second walls are further adapted to at least partially thermally isolate the primary compartment from the first and second compartments, respectively.

In some embodiments, the primary compartment of the heat exchanging apparatus includes a plurality of primary tubes extending along the longitudinal axis. The primary tubes are adapted for flow of the cooling fluid therethrough. The cooling fluid is adapted to exchange heat with the working fluid.

In some embodiments, the first compartment of the heat exchanging apparatus includes a plurality of first tubes extending along the longitudinal axis. The first tubes are adapted for flow of the cooling fluid therethrough. The cooling fluid is adapted to exchange heat with the first portion of the working fluid.

In some embodiments, the second compartment of the heat exchanging apparatus includes a plurality of second tubes extending along the longitudinal axis. The second tubes are adapted for flow of the cooling fluid therethrough. The cooling fluid is adapted to exchange heat with the second portion of the working fluid.

In some embodiments, the cooling fluid is adapted to flow along the longitudinal axis of the heat exchanging apparatus.

In some embodiments, the first portion of the working fluid towards the first end of the motor is cooler than the first portion of the working fluid towards the second end of the motor.

In some embodiments, the second portion of the working fluid towards the first end of the motor is cooler than the second portion of the working fluid towards the second end of the motor.

In some embodiments, the cooling fluid exiting the heat exchanging apparatus is adapted to flow along the housing of the motor, at the second end of the motor to facilitate cooling of the second end of the motor.

BRIEF DESCRIPTION OF THE DRAWINGS

For a more complete understanding of the present disclosure and its features and advantages, reference is made to the following description, taken in conjunction with the accompanying drawings, in which.

DETAILED DESCRIPTION

Illustrative embodiments of the present disclosure are described in detail herein. In the interest of clarity, not all features of the actual implementation are described in this specification. It will of course be appreciated that in the development of any such embodiment, numerous implementation specific decisions must be made to achieve developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of this disclosure. Furthermore, in no way should the following examples be read to limit or define the scope of the disclosure.

Figure 1A:
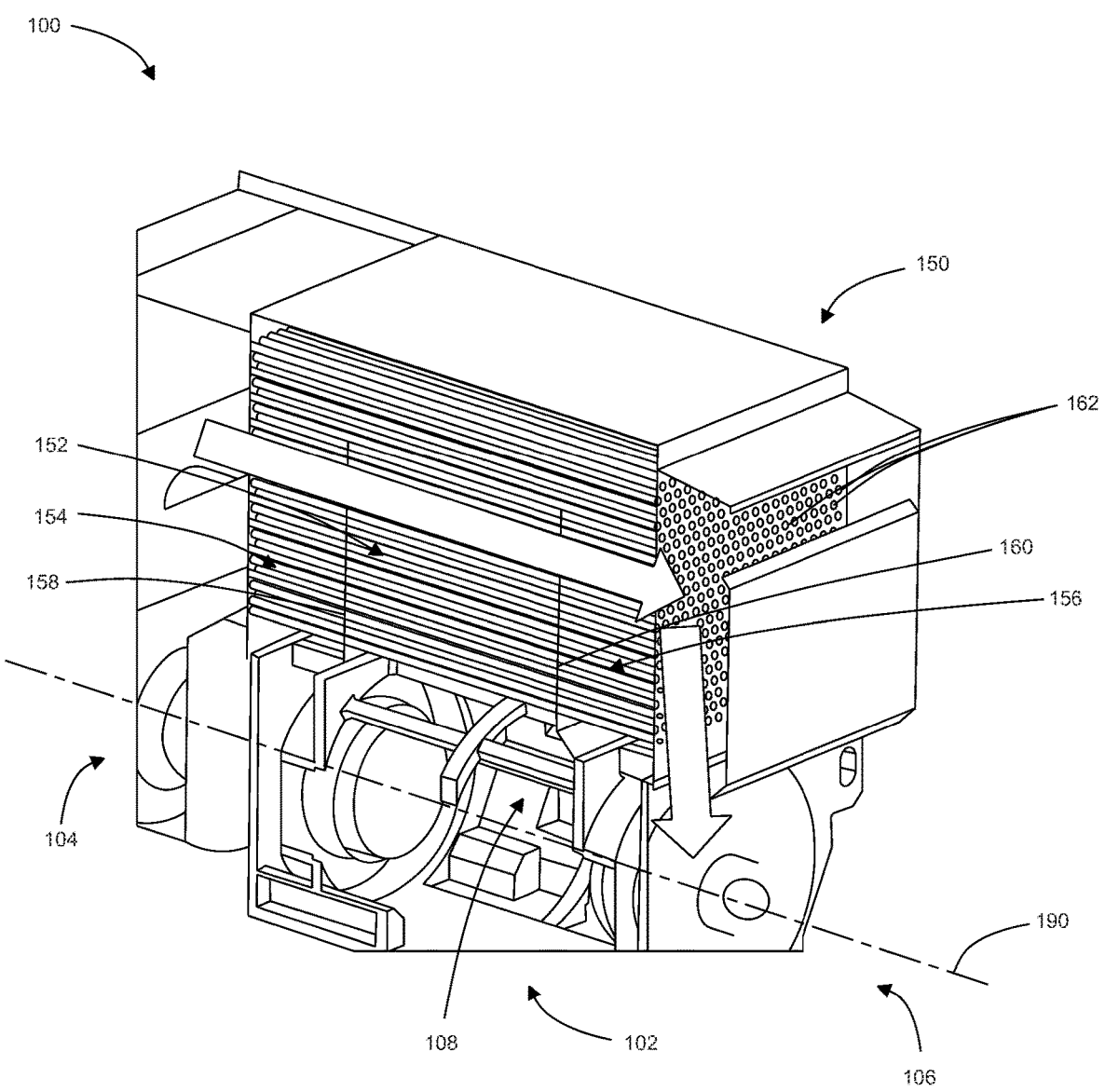
FIG. 1A illustrates a schematic sectional view of a motor assembly including a motor and a conventional heat exchanging apparatus.

FIG. 1A illustrates a schematic sectional view of a motor assembly 100 including a motor 102 and a conventional heat exchanging apparatus 150. The motor 102 may include a first end 104 and a second end 106 along a longitudinal axis 190 of the motor 102. In the illustrated embodiment of FIG. 1A, the longitudinal axis 190 passes through the first and second ends 104, 106 of the motor 102. In some embodiments, the first end 104 of the motor 102 may be a drive end (DE) of the motor 102, and the second end 106 of the motor 102 may be a non-drive end (NDE) of the motor 102. The motor 102 includes a stator and a rotor (not shown in figure) rotatably configured in the stator. The stator and rotor are provided within a housing 108 of the motor 102. A working fluid may be allowed to circulate through the housing 108 of the motor 102. The working fluid may be adapted to carry heat generated by operation of the motor 102, away from the housing 108. In some embodiments, the working fluid may be a liquid or a gas. In an example of the present disclosure, the working fluid may be air. In some embodiments, the working fluid may be re-circulated within the housing 108. The working fluid may absorb heat generated from the rotation of the rotor within the stator, and a heated working fluid may be carried away from the housing 108 to an external location, where the working fluid may be cooled. The cooled working fluid may then be recirculated back to the housing 108, thus cooling the stator and the rotor. The external location may be the heat exchanging apparatus 150.

The heat exchanging apparatus 150 may be interchangeably referred to as "the apparatus 150". The apparatus 150 is adapted to be configured on an external side of the motor 102, along the longitudinal axis 190 of the motor 102. Specifically, the apparatus 150 is configured between the first and second ends 104, 106 of the motor 102. In the illustrated embodiment of FIG. 1A, the apparatus 150 is configured along a top side of the motor 102. The apparatus 150 is adapted to be fluidically coupled to the housing 108 of the motor 102. In other words, the working fluid may be allowed to flow between the housing 108 of the motor 102 and the apparatus 150. The apparatus 150 is adapted to receive the heated working fluid from the housing 108 of the motor 102, cool the heated working fluid, and re-circulate the cooled working fluid back into the housing 108 of the motor 102.

Figure 1B:
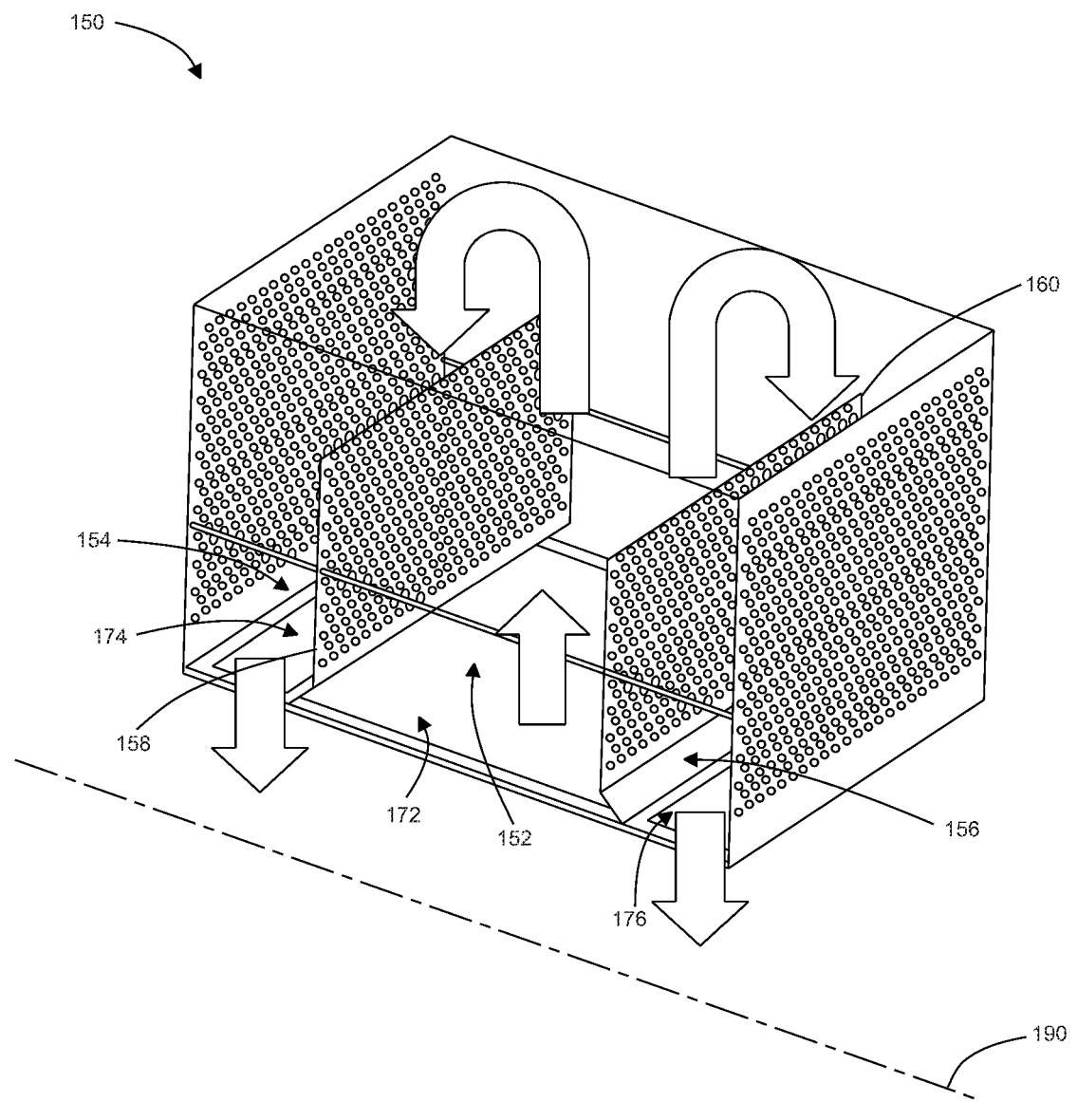
FIG. 1B illustrates a schematic sectional view of the conventional heat exchanging apparatus of FIG. 1A.

FIG. 1B illustrates a schematic sectional view of the apparatus 150. Referring now to FIGS. 1A and 1B, the apparatus 150 includes a primary compartment 152, a first compartment 154, and a second compartment 156. The primary, first and second compartments 152, 154, 156 are arranged along the longitudinal axis 190 of the motor 102. Further, the primary, first and second compartments 152, 154, 156 are arranged such that the first compartment 154 is towards the first end 104 of the motor, the primary compartment 152 is adjacent to the first compartment 154 and located towards the second end 106 of the motor 102, and the second compartment 156 is adjacent to the primary compartment 152 and located towards the second end 106 of the motor 102. The primary compartment 152 is partially separated from the first and second compartments 154, 156 by means of first and second walls 158, 160, respectively. Specifically, the first and second walls 158, 160 extend from a bottom of the apparatus 150, partially along a height of the apparatus 150. In some embodiments, the apparatus 150 including the primary, first and second compartments 152, 154, 156, and the first and second walls 158, 160 are made of a same material. In some embodiments, the material is an alloy including iron, such as a steel. In an example, the material is a 1010 low-carbon steel. In another example, the material is a 304 stainless steel.

Further, the apparatus 150 is fluidically coupled to the housing 108 of the motor 102. Specifically, the primary compartment 152 may be adapted to receive the heated working fluid from the housing 108 of the motor 102. The primary compartment 152 may receive the working fluid through an inlet 172. The first and second compartments 154, 156 may be adapted to transfer the working fluid back to the housing 108 of the motor 102. The first and second compartments 154, 156 may transfer the working fluid back to the housing 108 through outlets 174, 176, respectively.

The apparatus 150 further includes a plurality of tubes 162 arranged along its length, along the longitudinal axis 190 of the motor 102. Specifically, the tubes 162 may be arranged such that they pass through the primary, first and second compartments 152, 154, 156. The plurality of tubes 162 may be adapted to allow flow of a cooling fluid therethrough. In some embodiments, the cooling fluid may flow from a direction of the first end 104 of the motor 102, towards a direction of the second end 106 of the motor 102.

Figure 1C:
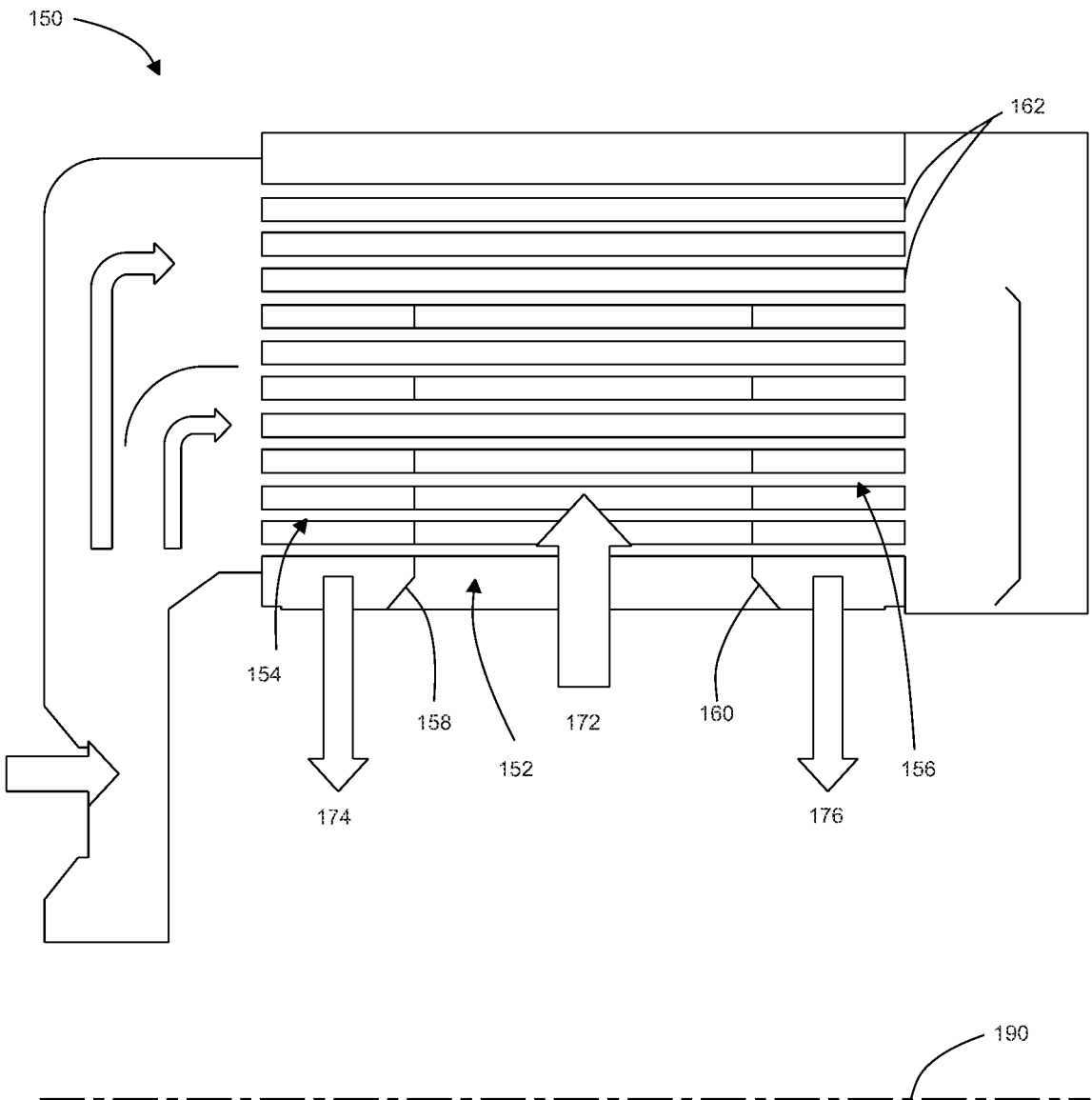
FIG. 1C illustrates a schematic sectional representation of the conventional heat exchanging apparatus of FIG. 1A.

FIG. 1C illustrates a schematic sectional representation of the apparatus 150. Referring now to FIGS. 1A-1C, the working fluid received by the primary compartment 152 may rise through the primary compartment 152, exchanging heat with the cooling fluid flowing in the plurality of tubes 162. A first portion of the working fluid is then transferred to the first compartment 154. Similarly, a second portion of the working fluid is then transferred to the second compartment 156. In some embodiments, the working fluid may rise through the primary compartment 152 due to a convection current. However, in some embodiments, the movement of the working fluid through the primary compartment 152 may be facilitated through a pump or a blower (not shown in figure).

The first compartment 154 is adapted to receive the first portion of the working fluid from the primary compartment 152. Specifically, the first compartment 254 is adapted to receive the first portion of the working fluid, which is at a temperature lower than a temperature of the working fluid received by the primary compartment 152 since some heat is lost by the received working fluid in the primary compartment 152 with the cooling fluid. The first portion of the working fluid received by the first compartment 154 flows downwards through the first compartment 154, exchanging heat with the cooling fluid flowing in the plurality of tubes 162. The first portion of the working fluid is then transferred to the housing 108 of the motor 102. The first portion of the working fluid transferred to the housing 108 of the motor 102 is at a temperature lower than the temperature of the first portion of the working fluid received by the first compartment 154.

Similarly, the second compartment 156 is adapted to receive the second portion of the working fluid from the primary compartment 152. Specifically, the second compartment 156 is adapted to receive the second portion of the working fluid, which is at a temperature lower than the temperature of the working fluid received by the primary compartment 152 since some heat is lost by the received working fluid in the primary compartment 152 with the cooling fluid. The second portion of the working fluid received by the second compartment 156 flows downwards through the second compartment 156, exchanging heat with the cooling fluid flowing in the plurality of tubes 162. The second portion of the working fluid is then transferred to the housing 108 of the motor 102. The second portion of the working fluid transferred to the housing 108 of the motor 102 is at a temperature lower than the temperature of the first portion of the working fluid received by the second compartment 156.

Furthermore, cooling fluid flowing through the tubes 162 gets hotter as it flows along the length of the tubes 162. As a result, a temperature of the cooling fluid towards the second end 106 of the motor 102 is higher than a temperature of the cooling fluid towards the first end 104 of the motor 102. Consequently, a heat capacity of the cooling fluid decreases as it flows along the length of the first tubes 164. As a result, the first portion of the working fluid is able to exchange a greater quantity of heat with the cooling fluid than the second portion of the working fluid is able to exchange heat with the cooling fluid towards the second end 106 of the motor 102. As a result, the first portion of the working fluid is cooler than the second portion of the working fluid. Such a temperature differential may result in uneven cooling of the housing 108 of the motor 102. Thus, in order to effectively provide cooling to the working fluid, a large number of tubes may need to be provided, and specialized cooling fluid may need to be provided.

Furthermore, the primary, first and second compartments 152, 154, 156 are not properly fluidically, or thermally isolated. As a result, there may be some heat exchange occurring between the working fluid in the primary compartment 152 and the working fluid in the first and second compartments 154, 156, thereby resulting in inefficient operation of the apparatus 150, and a lack of sufficient cooling of the working fluid.

In some examples, the difference between the temperatures of the first and second portions of the working fluid may be as high as about 11 degrees Centigrade (° C.). Further, in some examples, an average drop in temperature between the inlet working fluid and the cooled working fluid may be as low as about 34° C.

Figure 2A:
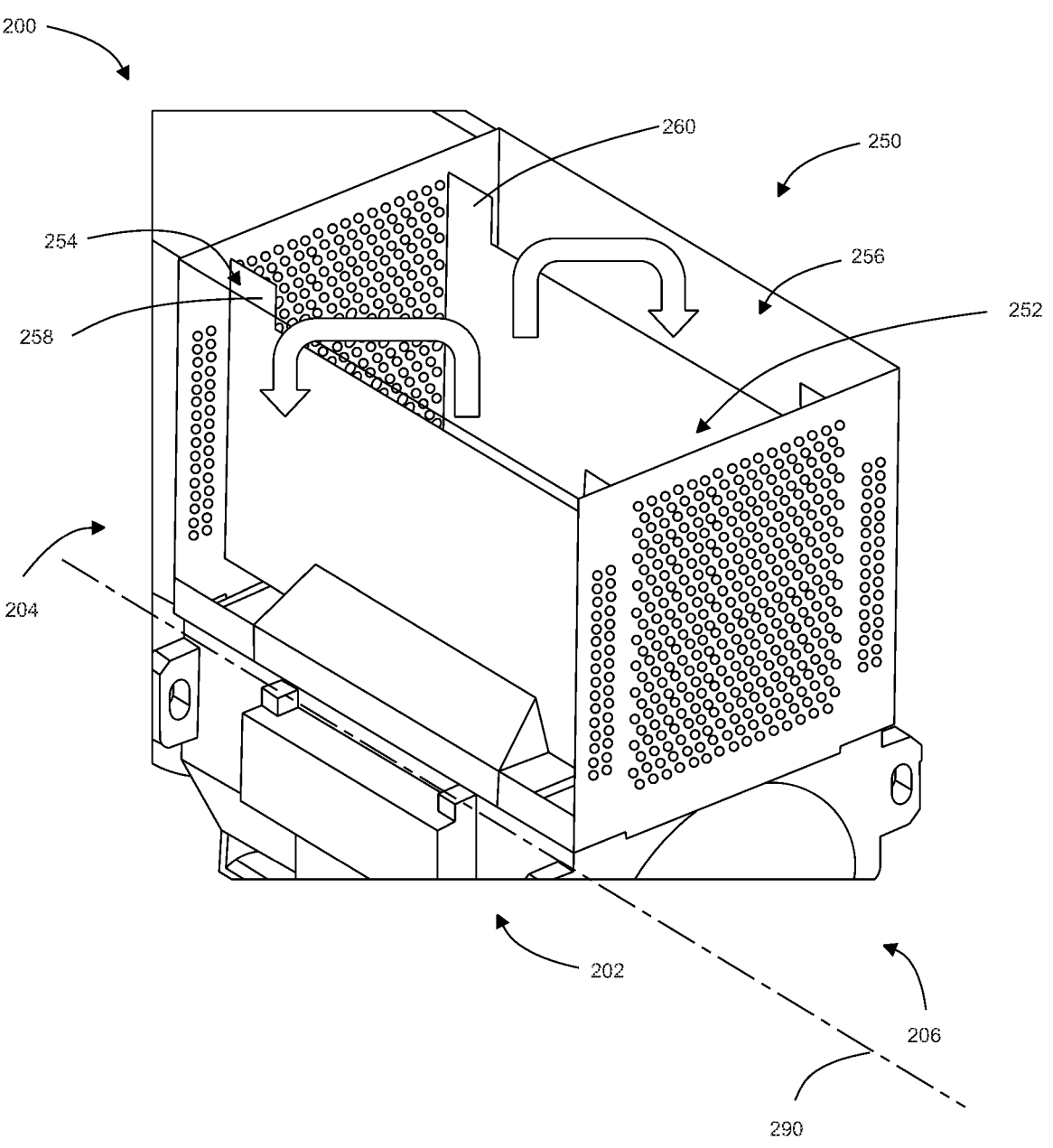
FIG. 2A illustrates a schematic perspective view of a motor assembly, according to an embodiment of the present disclosure.

FIG. 2A illustrates a schematic perspective view of a motor assembly 200, according to an embodiment of the present disclosure. The motor assembly 200 includes a motor 202. The motor 202 is substantially similar to the motor 102 of the motor assembly 100 of FIGS. 1A to 1C. The motor 202 includes a first end 204 and a second end 206 along a longitudinal axis 290 of the motor 202. In the illustrated embodiment of FIG. 2A, the longitudinal axis 290 passes through the first and second ends 204, 206 of the motor 202. In some embodiments, the first end 204 of the motor 202 may be a drive end (DE) of the motor 202, and the second end 206 of the motor 202 may be a non-drive end (NDE) of the motor 202.

The motor 202 includes a stator and a rotor (not shown in figure) rotatably configured in the stator. The stator and rotor are provided within a housing 208 of the motor 202. A working fluid may be allowed to circulate through the housing 208 of the motor 202. The working fluid may be adapted to carry heat generated by operation of the motor 202, away from the housing 208. In some embodiments, the working fluid may be a liquid or a gas. In an example of the present disclosure, the working fluid may be air. In some embodiments, the working fluid may be re-circulated within the housing 208. The working fluid may absorb heat generated from the rotation of the rotor within the stator, and a heated working fluid may be carried away from the housing 208 to an external location, where the working fluid may be cooled. The cooled working fluid may then be recirculated back to the housing 208, thus cooling the stator and the rotor. The external location may be a heat exchanging apparatus 250.

The heat exchanging apparatus 250 may be interchangeably referred to as "the apparatus 250". The apparatus 250 is adapted to be configured on an external side of the motor 202, along the longitudinal axis 290 of the motor 202. Specifically, the apparatus 250 is configured between the first and second ends 204, 206 of the motor 202. In the illustrated embodiment of FIG. 2A, the apparatus 250 is configured along a top side of the motor 202. The apparatus 250 is adapted to be fluidically coupled to the housing 208 of the motor 202. In other words, the working fluid may be allowed to flow between the housing 208 of the motor 202 and the apparatus 250. The apparatus 250 is adapted to receive the heated working fluid from the housing 208 of the motor 202, cool the heated working fluid, and re-circulate the cooled working fluid back into the housing 208 of the motor 202.

Figure 2B:
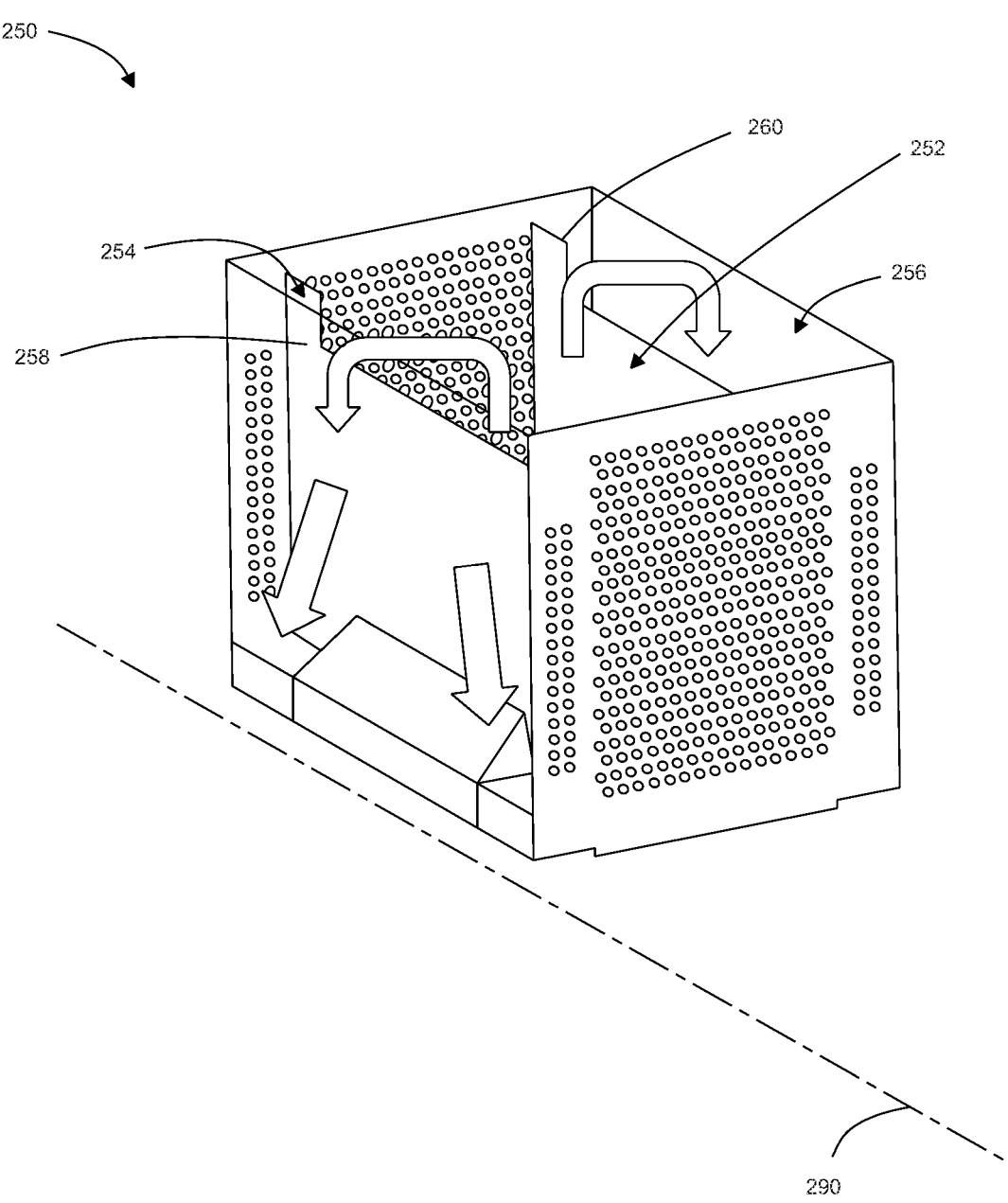
FIG. 2B illustrates a schematic sectional view of a heat exchanging apparatus of the motor assembly of FIG. 2B, according to an embodiment of the present disclosure.

FIG. 2B illustrates a schematic sectional view of the apparatus 250, according to an embodiment of the present disclosure. Referring now to FIGS. 2A and 2B, the apparatus 250 includes a primary compartment 252, a first compartment 254, and a second compartment 256. The primary, first and second compartments 252, 254, 256 are arranged along the longitudinal axis 290 of the motor 202. Further, the primary, first and second compartments 252, 254, 256 are arranged parallel to each other, and are adjacent to each other. Specifically, the first and second compartments 254, 256 are arranged opposite each other, on either side of the primary compartment 252. Furthermore, the primary, first and second compartments 252, 254, 256 are arranged between the first and second ends 204, 206 of the motor 202, such that the primary, first and second compartments 252, 254, 256 are each fluidically coupled to the housing 208 of the motor 202.

The primary compartment 252 is partially fluidically separated from the first and second compartments 254, 256 by means of first and second walls 258, 260, respectively.

Specifically, the first and second walls 258, 260 extend from a bottom of the apparatus 250, partially along a height of the apparatus 250, such that the primary compartment 252 is fluidically coupled to the first and second compartments 254, 256 at a top region of the apparatus 250.

Further, the first and second walls 258, 260 are adapted to at least partially thermally isolate the primary compartment 252 from the first and second compartments 254, 256, respectively.

In some embodiments, the apparatus 250 including the primary, first and second compartments 252, 254, 256, and the first and second walls 258, 260 are made of a same material. The material may be any having high thermal conductivity, low co-efficient of thermal expansion, high heat, and chemical resistance, and may be any, such as, without limitations, a metal, an alloy, a composite, etc. In some embodiments, the material is an alloy including aluminum. In an example, the material is a 6061 Aluminum alloy.

However, in some embodiments, the apparatus 250 including the primary, first and second compartments 252, 254, 256, and the first and second walls 258, 260 are made of different materials, as per desired application requirements.

Figure 3A:
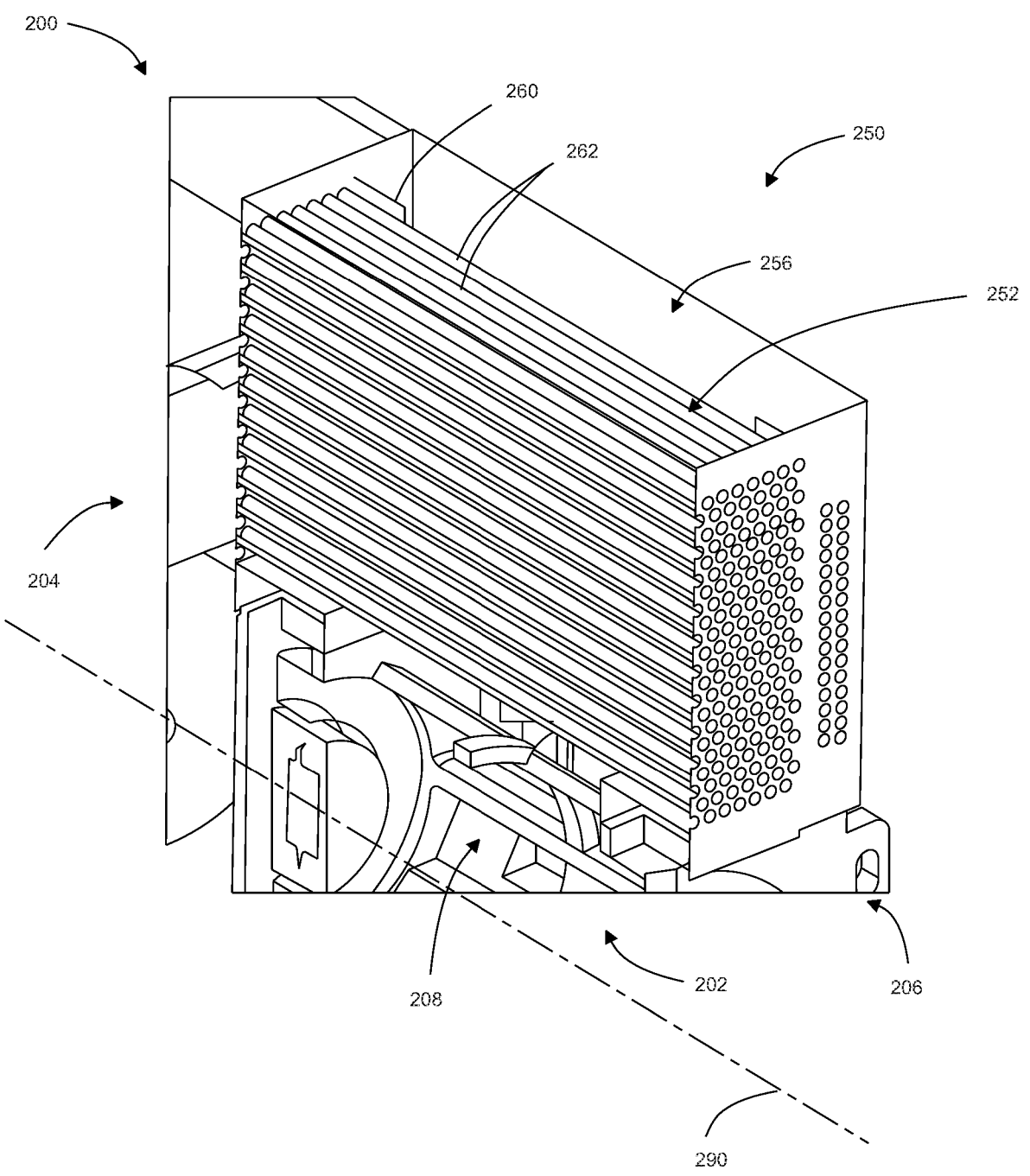
FIG. 3A illustrates a schematic sectional view of the heat exchanging apparatus of showing a primary compartment of the heat exchanging apparatus, according to an embodiment of the present disclosure.

FIG. 3A illustrates a schematic sectional view of the apparatus 250 showing the primary compartment 252 of the apparatus 250, according to an embodiment of the present disclosure. Referring now to FIGS. 2A and 3A, the primary compartment 252 is adapted to receive the working fluid from the housing 208 of the motor 202. Specifically, the primary compartment 252 is adapted to receive a heated working fluid from the housing 208 of the motor 202. The primary compartment 252 includes a plurality of primary tubes 262 arranged along its length, along the longitudinal axis 290 of the motor 202. The plurality of primary tubes 262 are adapted to allow flow of a cooling fluid therethrough. In some embodiments, the cooling fluid may flow from a direction of the first end 204 of the motor 202, towards a direction of the second end 206 of the motor 202. In some embodiments, the cooling fluid may be any liquid or gas that is at a temperature lower than a temperature of the working fluid received by the primary compartment 252. Generally, the cooling fluid may include a high heat capacity in order that it may exchange a maximum heat with the working fluid received by the primary compartment 252. In some embodiments, the cooling fluid may be a cooling air. In some embodiments, the cooling air may be pumped through the plurality of primary tubes 262 by a blower or a fan (not shown in figure).

The working fluid received by the primary compartment 252 rises through the primary compartment 252, exchanging heat with the cooling fluid flowing in the plurality of primary tubes 262. A first portion of the working fluid is then transferred to the first compartment 254 at the top region of the apparatus 250 where the primary compartment 252 is fluidically coupled to the first compartment 254. Similarly, a second portion of the working fluid is then transferred to the second compartment 256 at the top region of the apparatus 250 where the primary compartment 252 is fluidically coupled to the second compartment 256. In some embodiments, the working fluid may rise through the primary compartment 252 due to a convection current. However, in some embodiments, the movement of the working fluid through the primary compartment 252 may be facilitated through a pump or a blower (not shown in figure).

Figure 3B:
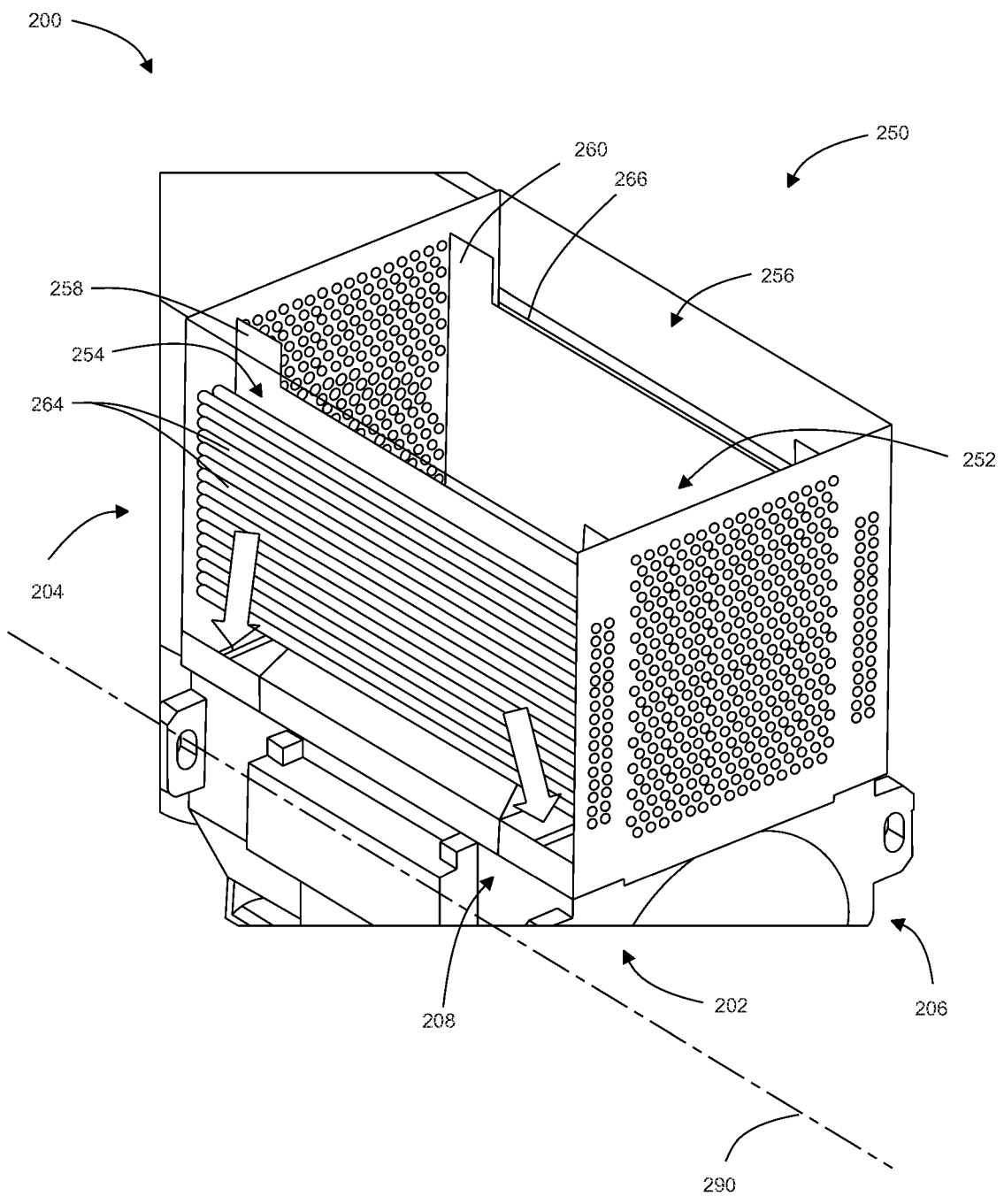
FIG. 3B illustrates a schematic sectional view of the heat exchanging apparatus showing first and second compartments of the heat exchanging apparatus, according to an embodiment of the present disclosure.

FIG. 3B illustrates a schematic sectional view of the apparatus 250 showing the first and second compartments 254, 256 of the apparatus 250, according to an embodiment of the present disclosure. Referring now to FIGS. 2A, 3A and 3B, the first compartment 254 is adapted to receive the first portion of the working fluid from the primary compartment 252. Specifically, the first compartment 254 is adapted to receive the first portion of the working fluid, which is at a temperature lower than a temperature of the working fluid received by the primary compartment 252 since some heat is lost by the received working fluid in the primary compartment 252 with the cooling fluid. The first compartment 254 includes a plurality of first tubes 264 arranged along its length, along the longitudinal axis 290 of the motor 202. The plurality of first tubes 264 are adapted to allow flow of a cooling fluid therethrough. In some embodiments, the cooling fluid may flow from a direction of the first end 204 of the motor 202, towards a direction of the second end 206 of the motor 202. In some embodiments, the cooling fluid may be from the same source as the cooling fluid flowing in the plurality of primary tubes 262.

The first portion of the working fluid received by the first compartment 254 flows downwards through the first compartment 254, exchanging heat with the cooling fluid flowing in the plurality of first tubes 264. The first portion of the working fluid is then transferred to the housing 208 of the motor 202. The first portion of the working fluid transferred to the housing 208 of the motor 202 is at a temperature lower than the temperature of the first portion of the working fluid received by the first compartment 254. In some embodiments, the first portion of the working fluid may flow downwards through the first compartment 254 pressure from the working fluid flowing through the primary compartment 252. However, in some embodiments, the movement of the first portion of the working fluid through the first compartment 254 may be facilitated through a pump or a blower (not shown in figure).

Furthermore, cooling fluid flowing through the first tubes 264 gets hotter as it flows along the length of the first tubes 264. As a result, a temperature of the cooling fluid towards the second end 206 of the motor 202 is higher than a temperature of the cooling fluid towards the first end 204 of the motor 202. Consequently, a heat capacity of the cooling fluid decreases as it flows along the length of the first tubes 264. As a result, the first portion of the working fluid is able to exchange a greater quantity of heat with the cooling fluid towards the first end 204 of the motor 202 than towards the second end of the motor 206. As a result, the first portion of the working fluid is cooler towards the first end 204 of the motor 202 than towards the second end of the motor 206.

Similarly, the second compartment 256 is adapted to receive the second portion of the working fluid from the primary compartment 252. Specifically, the second compartment 256 is adapted to receive the second portion of the working fluid, which is at a temperature lower than the temperature of the working fluid received by the primary compartment 252 since some heat is lost by the received working fluid in the primary compartment 252 with the cooling fluid. The second compartment 256 includes a plurality of second tubes 266 arranged along its length, along the longitudinal axis 290 of the motor 202. The plurality of second tubes 266 are adapted to allow flow of a cooling fluid therethrough. In some embodiments, the cooling fluid may flow from a direction of the first end 204 of the motor 202, towards a direction of the second end 206 of the motor 202. In some embodiments, the cooling fluid may be from the same source as the cooling fluid flowing in the plurality of primary tubes 262 and/or in the plurality of first tubes 264.

The second portion of the working fluid received by the second compartment 256 flows downwards through the second compartment 256, exchanging heat with the cooling fluid flowing in the plurality of second tubes 266. The second portion of the working fluid is then transferred to the housing 208 of the motor 202. The second portion of the working fluid transferred to the housing 208 of the motor 202 is at a temperature lower than the temperature of the first portion of the working fluid received by the second compartment 256. In some embodiments, the second portion of the working fluid may flow downwards through the second compartment 256 pressure from the working fluid flowing through the primary compartment 252. However, in some embodiments, the movement of the second portion of the working fluid through the second compartment 256 may be facilitated through a pump or a blower (not shown in figure).

Furthermore, cooling fluid flowing through the second tubes 266 gets hotter as it flows along the length of the second tubes 266. As a result, a temperature of the cooling fluid towards the second end 206 of the motor 202 is higher than a temperature of the cooling fluid towards the first end 204 of the motor 202. Consequently, a heat capacity of the cooling fluid decreases as it flows along the length of the second tubes 266. As a result, the second portion of the working fluid is able to exchange a greater quantity of heat with the cooling fluid towards the first end 204 of the motor 202 than towards the second end of the motor 206. As a result, the second portion of the working fluid is cooler towards the first end 204 of the motor 202 than towards the second end of the motor 206.

Figure 4A:
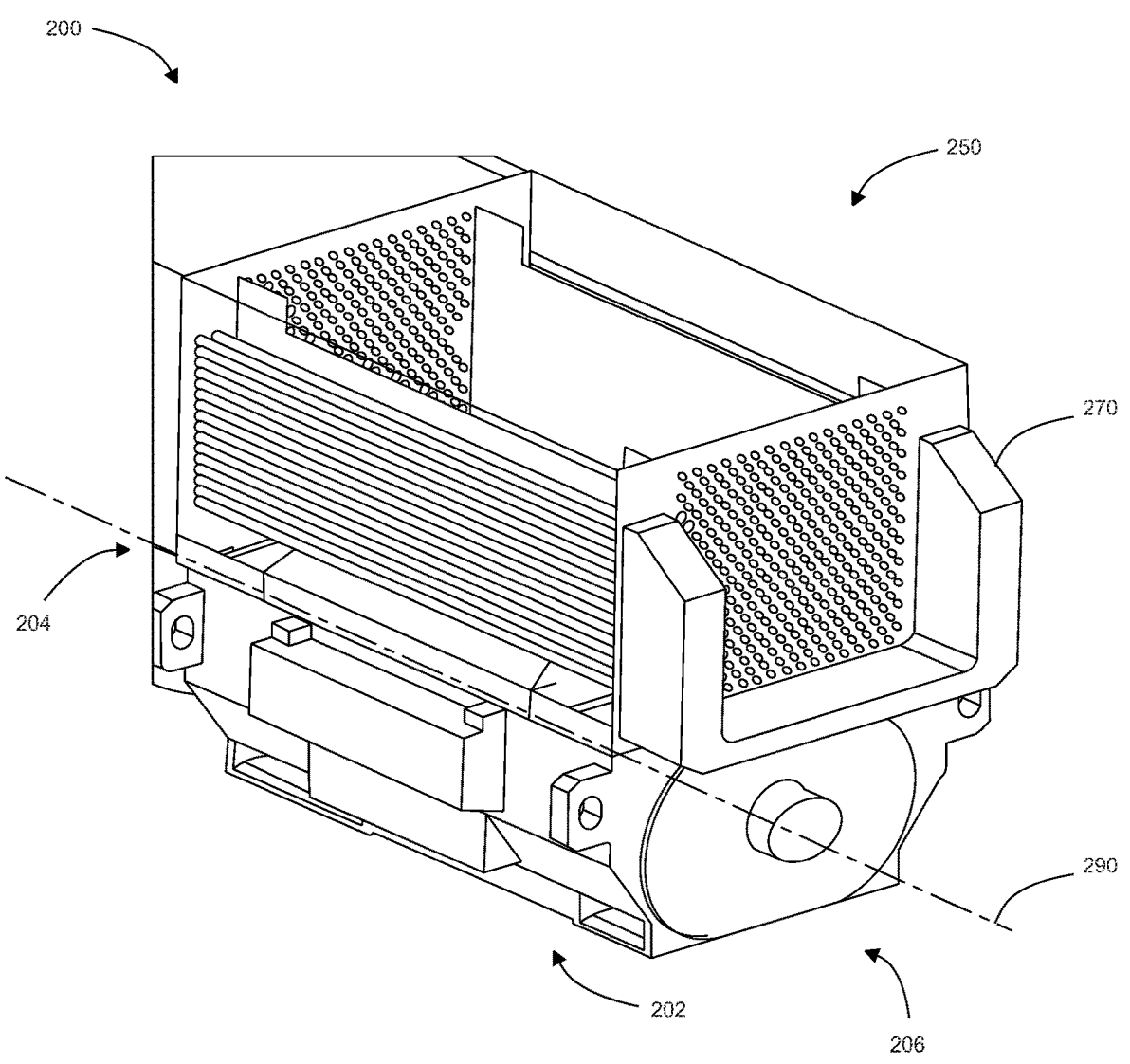
FIG. 4A illustrates a schematic perspective view of the motor assembly, according to another embodiment of the present disclosure.
Figure 4B:
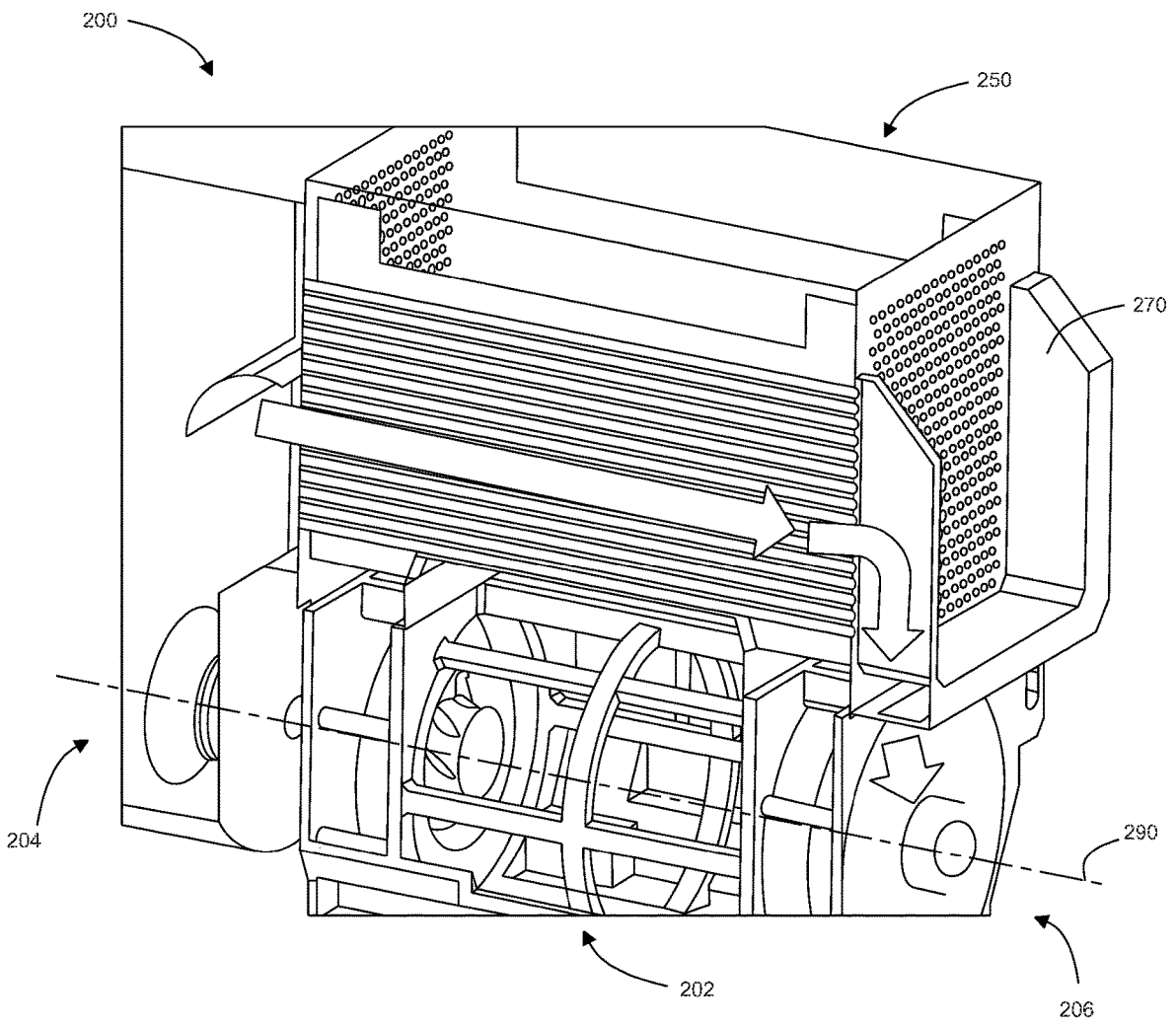
FIG. 4B illustrates a schematic sectional view of the motor assembly of FIG. 4A, according to an embodiment of the present disclosure.

FIGS. 4A and 4B illustrate schematic perspective and sectional views, respectively of the motor assembly 200, according to another embodiment of the present disclosure. Referring now to FIGS. 2A-4B, the apparatus 250 further includes a channel 270 disposed at an end of the apparatus 250 towards the second end 206 of the motor 202. The channel 270 includes passageways fluidically coupled to the first and second tubes 264, 266. The passageways are adapted to receive the cooling fluid from the first and second tubes 264, 266 and direct the received cooling fluid towards the housing 208 of the motor 202, at the second end 206 of the motor 202. Since the cooling fluid from the first and second tubes 264, 266 are cooler than the working fluid received by the primary compartment 252, it may be assumed that the cooling fluid from the first and second tubes 264, 266 are cooler than the housing 208 of the motor 202 at the second end 206 of the motor 202. As a result, the cooling fluid from the first and second tubes 264, 266 provide additional cooling to the housing 208 of the motor 202 as well as any bearings located adjacent or below channel 270.

In some examples, the difference between the temperatures of the first and second portions of the working fluid at the first end 204 and the second end 206 of the motor may be a low as about 10° C. Further, in some examples, an average drop in temperature between the inlet working fluid and the cooled working fluid may be as high as about 44° C.

Thus, the heated working fluid from housing 208 of the motor 202 is cooled in two stages before being recirculated to the housing 208, namely, first stage through the primary compartment 252, and the second stage through the first or second compartments 254, 256. The use of two-stages of cooling may allow for more effective cooling of the working fluid. Further, the primary compartment is at least partially thermally and fluidically isolated from the first and second compartments 254, 256, thus limiting heating of the first and second portions of the working fluid by the working fluid received by the primary compartment 252. Additionally, the use of a two-stage cooling process facilitates the use of fewer tubes carrying the cooling fluid, when compared to the conventional heat exchange apparatus 150, thus improving efficiency of the heat exchange apparatus 250, and reducing the complexity of construction and costs of the apparatus 250.

Although the disclosure and its advantages have been described in detail, it should be understood that various changes, substitutions and alterations can be made herein without departing from the spirit and scope of the disclosure as defined by the following claim.

The invention claimed is:

1. A motor assembly comprising:
a motor comprising a first end and a second end along a longitudinal axis of the motor; and
a heat exchanging apparatus adapted to be configured on an external side of the motor, along the longitudinal axis of the motor between the first end and the second end of the motor, the heat exchanging apparatus adapted to be fluidically coupled to a housing of the motor, the heat exchanging apparatus comprising:
a primary compartment arranged along the longitudinal axis of the heat exchanging apparatus, the primary compartment adapted to receive a working fluid from the housing of the motor;
a first compartment disposed adjacent to the primary compartment, the first compartment adapted to receive a first portion of the working fluid from the primary compartment and transfer the first portion of the working fluid to the housing of the motor; and
a second compartment disposed adjacent to the primary compartment and opposite the first compartment, the second compartment adapted to receive a second portion of the working fluid from the primary compartment and transfer the second portion of the working fluid to the housing of the motor, wherein the first compartment and the second compartment are both parallel to the primary compartment and disposed lateral to the longitudinal axis, and
wherein the heat exchanging apparatus is adapted to facilitate exchange of heat between the working fluid and a cooling fluid, such that the first and second portions of the working fluid being transferred to the housing of the motor is cooler than the working fluid received by the primary compartment of the heat exchanging apparatus.

2. The motor assembly of claim 1, wherein the heat exchanging apparatus is made of a first material comprising aluminum (Al).

3. The motor assembly of claim 1, wherein the primary compartment is partially fluidically separated from the first and second compartments by first and second walls, respectively, and wherein the first and second walls are adapted to at least partially thermally isolate the primary compartment from the first and second compartments, respectively.

4. The motor assembly of claim 1 further comprising a channel located at the second end of the motor wherein the cooling fluid is partially directed from the first end of the motor towards the second end of the motor to the channel and wherein the channel is configured to direct the cooling fluid to a portion of the motor.

5. The motor assembly of claim 1, wherein the first compartment of the heat exchanging apparatus comprises a plurality of first tubes extending along the longitudinal axis, the first tubes adapted for flow of the cooling fluid therethrough, and wherein the cooling fluid is adapted to exchange heat with the first portion of the working fluid.

6. The motor assembly of claim 1, wherein the second compartment of the heat exchanging apparatus comprises a plurality of second tubes extending along the longitudinal axis, the second tubes adapted for flow of the cooling fluid therethrough, and wherein the cooling fluid is adapted to exchange heat with the second portion of the working fluid.

7. The motor assembly of claim 1, wherein the cooling fluid is adapted to flow along the longitudinal axis of the heat exchanging apparatus.

8. The motor assembly of claim 7, wherein the first portion of the working fluid towards the first end of the motor is cooler than the first portion of the working fluid towards the second end of the motor.

9. The motor assembly of claim 7, wherein the second portion of the working fluid towards the first end of the motor is cooler than the second portion of the working fluid towards the second end of the motor.

10. The motor assembly of claim 7, wherein the cooling fluid exiting the heat exchanging apparatus is adapted to flow along the housing of the motor, at the second end of the motor to facilitate cooling of the second end of the motor.

11. A heat exchanging apparatus adapted for use with a motor, wherein:
the motor comprises a first end and a second end along a longitudinal axis of the motor; and
the heat exchanging apparatus is adapted to be configured on an external side of the motor, along the longitudinal axis of the motor between the first end and the second end of the motor, the heat exchanging apparatus is adapted to be fluidically coupled to a housing of the motor, and the heat exchanging apparatus comprises:
a primary compartment arranged along the longitudinal axis of the heat exchanging apparatus, the primary compartment adapted to receive a working fluid from the housing of the motor;
a first compartment disposed adjacent to the primary compartment, the first compartment adapted to receive a first portion of the working fluid from the primary compartment and transfer the first portion of the working fluid to the housing of the motor; and
a second compartment disposed adjacent to the primary compartment and opposite to the first compartment, the second compartment adapted to receive a second portion of the working fluid from the primary compartment and transfer the second portion of the working fluid to the housing of the motor, wherein the first compartment and the second compartment are both parallel to the primary compartment and disposed lateral to the longitudinal axis, and
the heat exchanging apparatus is adapted to facilitate exchange of heat between the working fluid and a cooling fluid, such that the first and second portions of the working fluid being transferred to the housing of the motor is cooler than the working fluid received by the primary compartment of the heat exchanging apparatus.

12. The heat exchanging apparatus of claim 11, wherein the heat exchanging apparatus is made of a first material comprising aluminum (Al).

13. The heat exchanging apparatus of claim 11, wherein primary compartment is partially fluidically separated from the first and second compartments by first and second walls, respectively, and wherein the first and second walls are adapted to at least partially thermally isolate the primary compartment from the first and second compartments, respectively.

14. The heat exchanging apparatus of claim 11 further comprising a channel located at the second end of the motor wherein the cooling fluid is partially directed from the first end of the motor towards the second end of the motor to the channel and wherein the channel is configured to direct the cooling fluid to a portion of the motor.

15. The heat exchanging apparatus of claim 11, wherein the first compartment of the heat exchanging apparatus comprises a plurality of first tubes extending along the longitudinal axis, the first tubes adapted for flow of the cooling fluid therethrough, and wherein the cooling fluid is adapted to exchange heat with the first portion of the working fluid.

16. The heat exchanging apparatus of claim 11, wherein the second compartment of the heat exchanging apparatus comprises a plurality of second tubes extending along the longitudinal axis, the second tubes adapted for flow of the cooling fluid therethrough, and wherein the cooling fluid is adapted to exchange heat with the second portion of the working fluid.

17. The heat exchanging apparatus of claim 11, wherein the cooling fluid is adapted to flow along the longitudinal axis of the heat exchanging apparatus.

18. The heat exchanging apparatus of claim 17, wherein the first portion of the working fluid towards the first end of the motor is cooler than the first portion of the working fluid towards the second end of the motor.

19. The heat exchanging apparatus of claim 17, wherein the second portion of the working fluid towards the first end of the motor is cooler than the second portion of the working fluid towards the second end of the motor.

20. The exchanging apparatus of claim 17, wherein the cooling fluid exiting the heat exchanging apparatus is adapted to flow along the housing of the motor, at the second end of the motor to facilitate cooling of the second end of the motor.

* * * * *